(12) United States Patent
Lee et al.

(10) Patent No.: US 7,564,916 B2
(45) Date of Patent: Jul. 21, 2009

(54) METHOD FOR ENCODING A MESSAGE USING DIAGONALLY WEIGHTED SPACE-TIME TRELLIS CODE DEPENDING ON BIT FEEDBACK

(75) Inventors: Jae Hong Lee, Seoul (KR); Young Seok Jung, Masan-si (KR)

(73) Assignee: Seoul National University Industry Foundation, Seoul (KR)

( * ) Notice: Subject to any disclaimer, the term of this patent is extended or adjusted under 35 U.S.C. 154(b) by 590 days.

(21) Appl. No.: 11/234,544

(22) Filed: Sep. 23, 2005

(65) Prior Publication Data

US 2006/0198462 A1 Sep. 7, 2006

(30) Foreign Application Priority Data

Mar. 5, 2005 (KR) ...................... 10-2005-0018408

(51) Int. Cl.
*H04B 7/02* (2006.01)

(52) U.S. Cl. ...................... 375/267; 375/260; 375/265; 455/561; 455/522; 455/101; 455/504; 455/69

(58) Field of Classification Search ................ 375/267
See application file for complete search history.

(56) References Cited

U.S. PATENT DOCUMENTS

| | | | |
|---|---|---|---|
| 7,058,363 B2 * | 6/2006 | Hottinen et al. | 455/69 |
| 7,181,167 B2 * | 2/2007 | Onggosanusi et al. | 455/63.1 |
| 7,292,644 B2 * | 11/2007 | Whang et al. | 375/267 |
| 7,298,797 B2 * | 11/2007 | Hwang et al. | 375/308 |
| 2005/0181736 A1 * | 8/2005 | Cao et al. | 455/69 |

OTHER PUBLICATIONS

V. Tarokh, N. Seshadri, and A. R. Calderbank, "Space-time codes for high data rate wireless communication: Performance criterion and code construction," IEEE Trans. Inform. Theory, vol. 44, pp. 744-765, Mar. 1998.

S. M. Alamouti, "A simple transmit diversity technique for wireless communications," IEEE J. Select. Areas Commun., vol. 16, pp. 1451-1458, Oct. 1998.

S. Bäro, G. Bauch, and A. Hansmann, "Improved codes for space-time trellis-coded modulation," IEEE Commun. Lett., vol. 4, pp. 20-22, Jan. 2000.

(Continued)

*Primary Examiner*—Shuwang Liu
*Assistant Examiner*—Lihong Yu
(74) *Attorney, Agent, or Firm*—Merchant & Gould P.C.

(57) ABSTRACT

Disclosed is a method for encoding messages with space-time trellis codes(STTC) and transmitting the encoded messages in communication system provided with at least two transmit antennas and at least one receive antenna. The method comprising generating a codeword by encoding message using STTC; generating a modified codeword by multiplying the codeword by unitary matrix V; and multiplying the modified codeword by weighting matrix W, and then transmitting it through transmit antennas. The weighting matrix W is determined depending on channel information fed back to the transmit antenna from the receive antenna. The unitary matrix V is the value that minimizes the union bound of frame error rate, and is chosen by computer search. Result of a simulation using the method shows that the performance of the STTC is improved over a wide range of feedback channel condition.

4 Claims, 4 Drawing Sheets

OTHER PUBLICATIONS

Q. Yan and R. S. Blum, "Improved space-time convolutional codes for quasi-static slow fading channels," IEEE Trans. Wireless Commun., vol. 1, pp. 563-571, Oct. 2002.

G. Jöngren, M. Skoglund, and B. Ottersten, "Combining beamforming and orthogonal space-time block coding," IEEE Trans. Inform. Theory, vol. 48, pp. 611-627, Mar. 2002.

G. Ganesan, P. Stoica, and E. G. Larsson, "Diagonally weighted orthogonal space-time block codes," in Proc. Asilomar Conf. On Signals, Systems and Computers, Pacific Grove, CA, Nov. 2002. pp. 1147-1151.

E. G. Larsson, G. Ganesan, P. Stoica, and W. Wong, "On the performance of orthogonal space-time block coding with quantized feedback," IEEE Commun. Lett., vol. 6, pp. 487-489, Nov. 2002.

R. A. Horn and C. R. Johnson, Matrix analysis, New York: Cambridge Univ. Press, 1988. p. 171.

H. A. David, Order Statistics, 2nd ed., John Wiley & Sons, Inc., 1981. p. 8-10.

* cited by examiner

METHOD FOR ENCODING A MESSAGE USING DIAGONALLY WEIGHTED SPACE-TIME TRELLIS CODE DEPENDING ON BIT FEEDBACK

BACKGROUND OF THE INVENTION

1. Field of the Invention

The present invention relates to a method for encoding messages with space-time trellis codes(STTC) and transmitting the encoded messages in communication system wherein at least two transmit antennas and at least one receive antenna are provided. The method comprising steps of: generating a codeword by encoding message using STTC; generating a modified codeword by multiplying the codeword by unitary matrix V; and multiplying the modified codeword by weighting matrix W, and then transmitting it through transmit antennas. The weighting matrix W is determined depending on channel information which is fed back to the transmit antenna from the receive antenna. The unitary matrix V is the value that minimizes the union bound of frame error rate, and is chosen by computer search.

2. Description of the Prior Art

Since the introduction of the bandwidth and power efficient methods that realize the benefits of multiple transmit antennas, there has been considerable interest in the space-time codes(STCs). Most work on STCs assumes that the channel information at the transmitter is not available. However, in some communication systems, it is reasonable to assume that channel information at the transmitter is available. Some results showed that the feedback of channel information from the receiver to the transmitter improve the performance of orthogonal space-time block coding (OSTBC). With OSTBC, the unquantized, but not perfect, channel information was used to effectively combine the transmit beam-forming. In some results, it is shown that the diagonally weighting scheme using the quantized feedback achieves the good performance and the robustness to the feedback channel errors.

However, in relation to STTCs, there is no disclosure about a design of diagonal weighting scheme that uses quantized feedback.

SUMMARY OF THE INVENTION

The present invention applied the diagonal weighting scheme to STTCs. In case of perfect feedback channel, performance criteria for designing STTC and feedback scheme is derived, and a modification of conventional STTC is proposed based on the performance criteria. While the modified STTC has the same performance in the absence of feedback of channel information, the modified STTC achieves the improved performance in the presence of feedback of channel information. Simulation results show that the diagonal weighting feedback scheme using the modified STTCs achieves the robustness to the feedback channel errors.

Therefore, the object of the present invention is to provide a method for encoding messages using diagonally weighted STTC depending on the feedback channel information in a communication system employing at least two transmit antennas and at least one receive antennas.

The present invention relates to a method for encoding messages with space-time trellis codes(STTCs) and transmitting the encoded messages in communication system wherein at least two transmit antennas and at least one receive antennas are provided. The method comprises steps of: generating a codeword X by encoding messages using STTC; and multiplying the codeword X by weighting matrix W, and then transmitting it through the transmit antennas.

Also, the present invention relates to a method for encoding messages with STTCs and transmitting the encoded messages in communication system, wherein at least two transmit antennas and at least one receive antennas, comprising steps of: generating a codeword X by encoding messages using STTCs; generating a modified codeword $\bar{X}$ by multiplying the codeword X by unitary matrix V; and multiplying the modified codeword $\bar{X}$ by weighting matrix W, and then transmitting it through the transmit antennas.

In the present invention, the weighting matrix W is determined by the feedback channel information returned to the transmit antenna from the receive antenna. The unitary matrix V is value that minimizes the union bound of frame error rate (FER), and is chosen by computer search.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

First, a diagonally weighted STTC is explained.

A communication system employing two transmit antennas and m receive antennas that operates in flat Rayleigh fading channels is considered. It is assumed that the channel coefficients for different transmit-receive antenna pairs are statistically independent. It is further assumed that the channel coefficients remain constant during a frame (1 symbols) and vary independently from one frame to another.

In the case of the conventional STTC without feedback, the baseband constellation symbol $x_{i,t}$, encoded by the space-time encoder is transmitted by antenna i at time t. Then the signal that arrives at each of the m receive antennas is a noisy superposition of two transmitted signals corrupted by fading and is given by the equation 1 below:

$$y_{j,i} = \sum_{i=1}^{2} \sqrt{E_S}\, h_{j,i} x_{i,t} + n_{j,t} \qquad \text{[Equation 1]}$$

wherein, $h_{j,i}$ is the channel coefficient from transmit antenna i to receive antenna j, $n_{j,t}$ is the additive noise for receive antenna j at time t, and Es is the energy per symbol.

The channel coefficient $h_{j,i}$ is independent (with respect to i and j) and identically distributed zero mean circularly symmetric complex Gaussian random variable with variance 0.5 per dimension.

The additive noise $n_{j,t}$ is independent (with respect to both t and j) and identically distributed zero-mean circularly symmetric complex Gaussian random variable with variance $N_o/2$ per dimension.

Above received signals can be expressed with equation 2 below:

$$Y = \sqrt{E_S}\, HX + N \qquad \text{[Equation 2]}$$

Wherein, $Y = \{y_{j,t}\}$ is the m×1 matrix of received signals, $X = \{x_{i,t}\}$ is the 2×1 matrix of transmitted signals, $H = \{h_{j,i}\}$ is the m×2 matrix of Rayleigh fading coefficients, and $N = \{n_{j,t}\}$ is the m×1 matrix of additive noise.

In the case of diagonally weighed STTC (DW-STTC), the encoded signal matrix, i.e., codeword X is pre-multiplied with a weighting matrix W taken from a weighting matrix constellation $W = \{W_1, W_2\}$, and it is transmitted from two transmit antennas. The weighting matrix $W_1$ or $W_2$ is selected according to the bit feedback information transmitted from the receive antenna to the transmit antenna. This bit feedback information is decided by the condition of channel H.

Then the received signal matrix Y can be written as equation 3 below.

$$Y = \sqrt{E_S}\, HWX + N \qquad \text{[Equation 3]}$$

In the presence of feedback errors, the estimation of the weighting matrix is required at the receivers. In the present invention, it is assumed that the receiver perfectly knows the weighting matrix used by the transmitter as well as channel state information (CSI). Then the receiver can detect the codeword as following equation 4.

$$\hat{X} = \arg\min_{X \in C} tr((Y - HWX)(Y - HWX)^\dagger) \qquad \text{[Equation 4]}$$

Wherein,

C is the set of all codewords, tr(A) is the trace of A, and

† denotes the complex conjugate transpose.

In the present invention, the following feedback scheme in equation 5 using diagonal weighting matrices is applied:

$$W_1 = \begin{bmatrix} \omega & 0 \\ 0 & \sqrt{1-\omega^2} \end{bmatrix}, \text{ if } |h_1|^2 > |h_2|^2 \qquad \text{[Equation 5]}$$

$$W_2 = \begin{bmatrix} \sqrt{1-\omega^2} & 0 \\ 0 & \omega \end{bmatrix}, \text{ otherwise}$$

wherein, $\omega$ is some positive real number such that $0.5 \leq \omega^2 \leq 1$, and hi denotes the i th column of H.

In the case of the perfect feedback channel, the conditional pairwise error probability (PEP), which means the probability that transmitted matrix sequence X is incorrectly determined to be other matrix sequence X', for a given H is given by equation 6 below.

$$p(X \to X'|H) \leq \exp(-\rho\, tr(HW_k A_{XX'} W_k^\dagger H^\dagger)) \qquad \text{[Equation 6]}$$

wherein, $\rho = E_s/4N_0$, $A_{XX'} = (X-X')(X-X')^\dagger$.

k is 1 for $|h_1|^2 > |h_2|^2$ and 2 for $|h_1|^2 < |h_2|^2$. That is, the weighting matrix $W_k$ is decided to be $W_1$ or $W_2$ depending on the size of the norm of the column vector in channel H. The norm of the column vector in the channel H can be known by feedback bit information from the receiver to the transmitter. For example, when $|h_1|^2 > |h_2|^2$ in channel H, the receiver transmits "0" bit to the transmitter, and the transmitter which received "0" feedback bit will weigh with the weighting matrix $W_1$ and transmit. On the other hand, when $|h_1|^2 \leq |h_2|^2$ in channel H, the receiver transmits "1" bit to the transmitter, and the transmitter which received "1" bit will weigh with the weighting matrix $W_2$ and transmit.

Since $A_{X,X'}$ of equation 6 is Hermitian, there is a unitary matrix U and a real diagonal matrix $\Lambda = \text{diag}(\lambda_1, \lambda_2)$ such that $A_{X,X'} = U\Lambda U^\dagger$.

The 2×2 unitary matrix U can be expressed as equation 7 below.

$$U = \begin{bmatrix} re^{j\theta_1} & \sqrt{1-r^2}\, e^{j\theta_2} \\ \sqrt{1-r^2}\, e^{j\theta_3} & re^{j(\theta_2-\theta_1+\theta_3+\pi)} \end{bmatrix} \qquad \text{[Equation 7]}$$

wherein, $0 \leq r \leq 1$ and $-\pi = \theta_1, \theta_2, \theta_3 = \pi$. For simple notation, we denote 2×2 unitary matrix as $U = \text{unit}(r, \theta_1, \theta_2, \theta_3)$.

Let $h_{max} = [h_{1,max} \cdots h_{m,max}]^T$ and $h_{min} = [h_{1,min} \cdots h_{m,min}]^T$ denote the columns of H with the largest and smallest norm.

After averaging the conditional PEP $p(X \to X'|H) = \exp(-\rho\, tr(HW_k A_{X,X'} W_k^\dagger H^\dagger))$ with respect to independent uniform distributions of $\angle h_{j,max}$ and $\angle h_{j,min}$, the following conditional PEP for a given equation 8 can be obtained:

$$p\left(X \to X' \middle| \left\{ \begin{array}{l} |h_{j,\max}|, \\ |h_{j,\min}| \end{array} \right\} \right) = \frac{1}{2} \prod_{j=i}^{m} I_0(\rho \xi |h_{j,\max}||h_{j,\min}|) \times \qquad \text{[Equation 8]}$$

$$\left( \exp\left( -\rho \left( \omega^2 \gamma_1 \sum_{j=1}^{m} |h_{j,\max}|^2 + (1-\omega^2)\gamma_2 \sum_{j=1}^{m} |h_{j,\min}|^2 \right) \right) + \right.$$

-continued $$\exp\left(-\rho\left(\begin{array}{c}\omega^2\gamma_2\sum_{j=1}^{m}|h_{j,\max}|^2 + \\ (1-\omega^2)\gamma_1\sum_{j=1}^{m}|h_{j,\min}|^2\end{array}\right)\right)$$

Wherein, $\gamma_1 = \lambda_1 r^2 + \lambda_2(1-r^2)$, $\gamma_2 = \lambda_1(1-r^2) + \lambda_2 r^2$, $\xi = 2(\lambda_1 - \lambda_2)\omega r\sqrt{1-\omega^2}\sqrt{1-r^2}$, and $I_0(x)$ is zero-order modified Bessel function of the first kind.

The equation 8 shows that the only $\omega, \lambda_1, \lambda_2$, and r affect the performance of STTC with feedback channel. In particular, we see that r, as well as $\lambda_1$ and $\lambda_2$, affects the performance of STTC with feedback channel. Unfortunately, since it is intractable to average the right hand side of equation 8 with respect to distribution of $\{|h_{j,max}|, |h_{j,min}|\}$, the optimum values of $\omega, \lambda_1, \lambda_2$, and r minimizing average PEP are not obtained. Furthermore, a maximum PEP does not determine the frame error rate (FER) in slow fading channel. In the present invention, the following design criteria for the STTC and the weighting matrices are used.

[Design Criteria]

Criterion 1: The minimum value of $\gamma_1$ and $\gamma_2$ has to be maximized. Specifically, the sum of eigenvalues of the matrix $A_{X,X'}$ has to be maximized and the difference of eigenvalues of the matrix $A_{X,X'}$ has to be minimized. In other words, both sum and product of eigenvalues of the matrix $A_{X,X'}$ has to be maximized simultaneously, $|r^2 - 0.5|$ has to be minimized.

Criterion 2: The absolute value of $\xi$ has to be minimized. If $\omega=1$ and/or $\lambda 1 = \lambda 2$, the absolute value of $\xi$ is minimized.

Since the STTCs have generally the unequal eigenvalues, criterion 2 says that $\omega=1$ is appropriate in perfect feedback channel.

Criterion 1 shows that the design criterion of STTC with feedback is similar to the design criterion of STTC without feedback. In particular, if $r^2$ can be adjusted without changing the eigenvalues of the matrix $A_{XX'}$, the STTC with improved performance can be constructed.

In this embodiment according to the present invention, STTC with two transmit antennas is used. In order to adjust $r^2$ without changing eigenvalues of $A_{XX'}$, we consider a following modification of STTC.

Let $V = \text{unit}(\hat{r}, \hat{\theta}_1, \hat{\theta}_2, \hat{\theta}_3)$ denote the 2×2 unitary matrix as equation 7a below:

$$V = \begin{bmatrix} \hat{r}e^{j\hat{\theta}_1} & \sqrt{1-\hat{r}^2}\, e^{j\hat{\theta}_2} \\ \sqrt{1-\hat{r}^2}\, e^{j\hat{\theta}_3} & \hat{r}e^{j(\hat{\theta}_2 - \hat{\theta}_1 + \hat{\theta}_3 + \pi)} \end{bmatrix} \quad \text{[Equation 7a]}$$

Then, $\overline{C}$, the modified STTC of C, can be constructed as equation 9 below:

$$\overline{C} = \{\overline{X} | \overline{X} = VX, X \in C\} \quad \text{[Equation 9]}$$

While the modified STTC $\overline{C}$ has the same performance as C in the absence of feedback, $\overline{C}$ can achieve the improved performance in the presence of feedback if V is appropriately chosen.

In this case, the received signal at receive antenna can be expressed as equation 3a below:

$$Y = \sqrt{E_S}HW\overline{X} + N \quad \text{[Equation 3a]}$$

The conditional PEP for channel coefficient H is expressed as equation 6a below:

$$p(X \to \overline{X}'|H) \leq \exp(-\rho tr(HW_k A_{\overline{X},\overline{X}'} W_k^\dagger H^\dagger)) \quad \text{[Equation 6a]}$$

For $\overline{X} = VX$ and $\overline{X}' = VX'$, since the corresponding $A_{\overline{X},\overline{X}'}$ is Hermitian, $A_{\overline{X},\overline{X}'}$ is written as $A_{\overline{X},\overline{X}'} = \overline{U}\Lambda\overline{U}^\dagger$ wherein $\overline{U} = \text{unit}(\bar{r}, \bar{\theta}_1, \bar{\theta}_2, \bar{\theta}_3)$ is unitary and $\Lambda = \text{diag}(\lambda_1, \lambda_2)$ is real diagonal matrix. From the following relation $\overline{U} = VU$, equation 10 is derived:

$$\bar{r}^2 = r^2\hat{r}^2 + (1-r^2)(1-\hat{r}^2) + \quad \text{[Equation 10]}$$
$$2r\hat{r}\sqrt{1-r^2}\sqrt{1-\hat{r}^2}\cos(\theta_1 - \theta_3 + \hat{\theta}_1 - \hat{\theta}_2).$$

Equation 10 shows that only $\hat{r}$ and $\hat{\theta}_1 - \hat{\theta}_2$ affect the value of $\bar{r}^2$. If there is a pairwise error event determining the performance, V can be simply chosen. In slow fading channels, however, it is known that performance of STTC is affected by many pairwise error events due to the limited diversity. Furthermore, there are different matrices $A_{X,X'}$ associated with the maximum PEP. Thus, the optimum unitary matrix V was found through computer search.

First, the criterion to choose the unitary matrix V is derived. For simple expression, it is assumed that there is one receive antenna. In perfect feedback channel, $\omega=1$ is used, and then the conditional PEP for modified DW-STTC (MDW-STTC) can be expressed as equation 11 below:

$$p(\overline{X} \to \overline{X}'||h_{1,max}|, |h_{1,min}|) \leq \tfrac{1}{2}\cdot\exp(-\rho \bar{\gamma}_1 |h_{1,max}|^2) + \exp(-\rho \bar{\gamma}_2 |h_{1,max}|^2)) \quad \text{[Equation 11]}$$

wherein, $\bar{\gamma}_1 = \lambda_1 \bar{r}^2 + \lambda_2(1-\bar{r}^2)$ and $\bar{\gamma}_2 = \lambda_1(1-\bar{r}^2) + \lambda_2 \bar{r}^2$.

From order statistics, the probability density function (pdf) of $|h_{1,max}|^2$ is given by equation 12 below:

$$p_{|h_{1,max}|^2}(x) = 2\exp(-x)(1-\exp(-x)), x \geq 0 \quad \text{[Equation 12]}$$

Then, the average PEP for MDW-STTC can be obtained as equation 13 below:

$$p(\overline{X} \to \overline{X}') \leq \frac{1}{(\rho\bar{\gamma}_1 + 1)(\rho\bar{\gamma}_1 + 2)} + \frac{1}{(\rho\bar{\gamma}_2 + 1)(\rho\bar{\gamma}_2 + 2)} \leq \quad \text{[Equation 13]}$$
$$(\bar{\gamma}_1^{-2} + \bar{\gamma}_2^{-2})\rho^{-2}.$$

From the union bound, the frame error rate (FER) is given by equation 14:

$$P_f(e) \leq \sum_{\overline{X} \in \overline{C}} \sum_{\overline{X}' \in \overline{C}, \overline{X}' \neq \overline{X}} (\bar{\gamma}_1^{-2}(\overline{X}, \overline{X}') + \bar{\gamma}_2^{-2}(\overline{X}, \overline{X}'))\rho^{-2}. \quad \text{[Equation 14]}$$

Now, the optimum unitary matrix V minimizing the union bound of FER can be found. However, it is tedious to compute the union bound using all pairwise error events. Thus, the truncated union bound was computed using the pairwise error events with the first three minimum determinants. The values of $\hat{r}^2$ and $\hat{\theta}_1 - \hat{\theta}_2$ corresponding to the optimum V minimizing the truncated union bound are listed in Table I:

TABLE I

The values of $\hat{r}^2$ and $\hat{\theta}_1-\hat{\theta}_2$ corresponding to
the optimum V minimizing the truncated union bound

| The number of states | $\hat{r}^2$ | $\hat{\theta}_1-\hat{\theta}_2$ |
|---|---|---|
| 4 | 0.73 | 1.50π |
| 8 | 0.50 | 1.00π |
| 16 | 0.50 | 1.25π |
| 32 | 0.50 | 1.75π |

In this embodiment, $\hat{\theta}_1=0$ and $\hat{\theta}_3=0$ are set.

Figure 1:
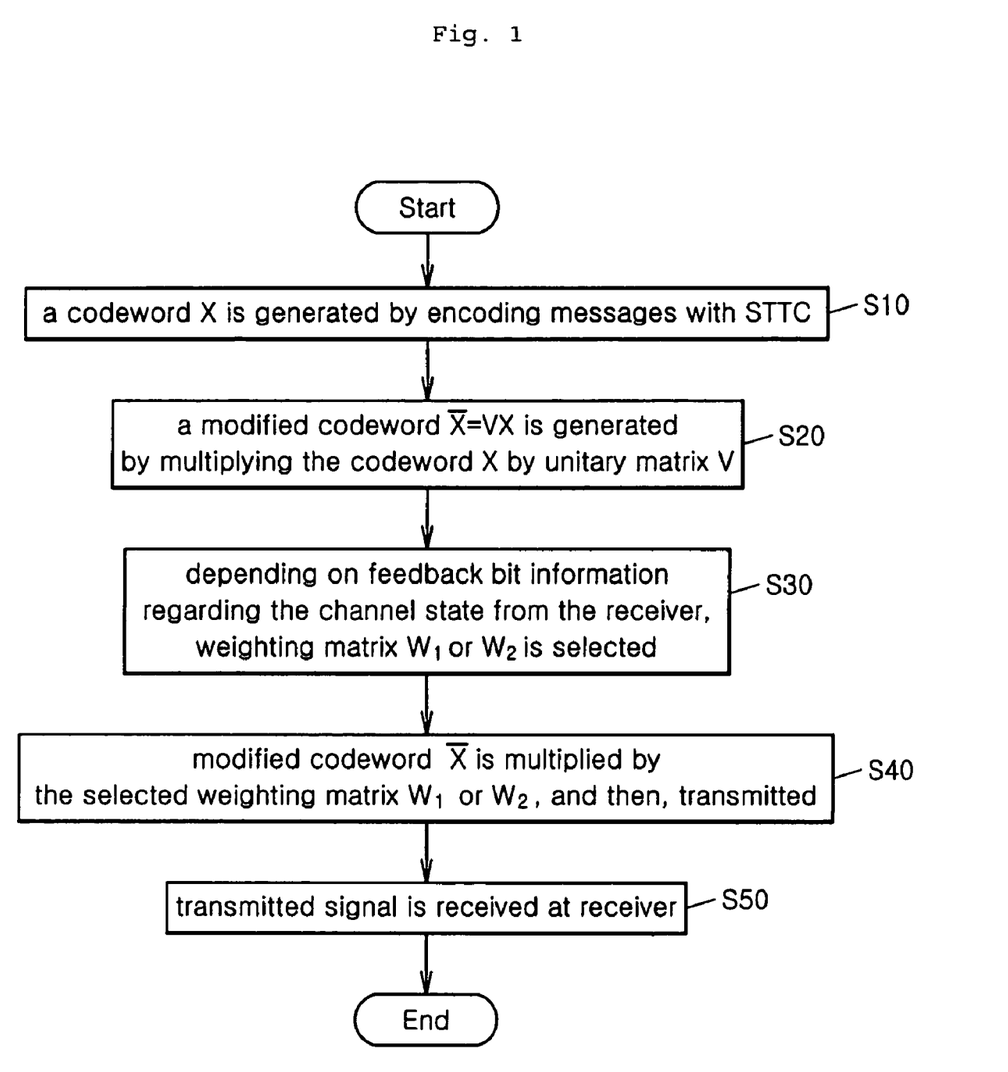
FIG. 1 is a flow chart of a method for encoding messages using diagonally weighted STTC according to the present invention.

FIG. 1 is a flow chart of a method for encoding messages using diagonally weighted STTC according to the present invention.

First, a transmitter generates a codeword X by encoding messages with STTC at step S10.

Then, a modified codeword $\bar{X}$ is generated by multiplying the codeword X by unitary matrix V such as equation 7a at step S20.

Then, depending on feedback bit information regarding the channel state from the receiver, the choice is made between weighting matrix $W_1$ and $W_2$ as equation 5 at step S30.

Then, the modified codeword $\bar{X}$ is multiplied by the selected weighting matrix $W_1$ or $W_2$, and then, transmitted through transmit antenna at step S40. The transmitted signal is received at the receiver as a receive signal of equation 3a at step S50.

$$Y=\sqrt{E_s}HW\bar{X}+N \qquad \text{[Equation 3a]}$$

wherein, $\bar{X}$ is 2×1 matrix,

W is 2×2 weighting matrix,

H is m×2 matrix of channel coefficients,

N is m×1 matrix of additive noise,

Es is energy per symbol, and

Y is m×1 matrix of received signals at receive antenna.

Figure 2:
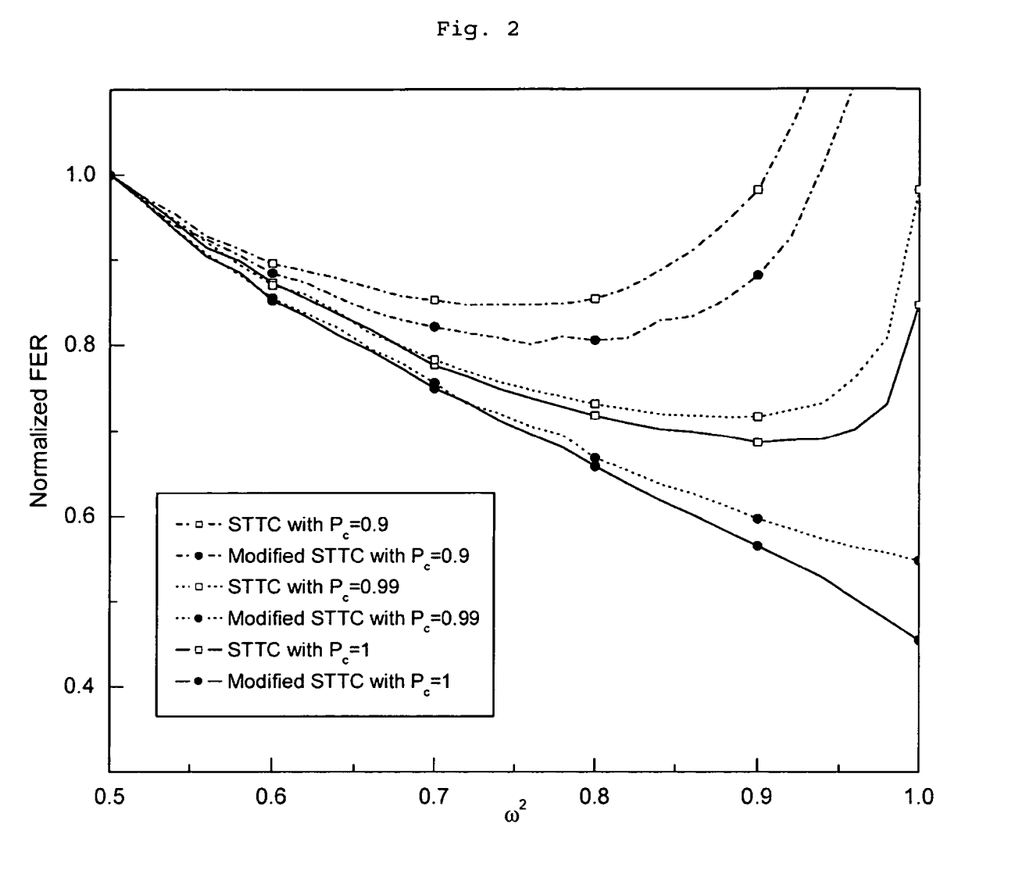
FIG. 2 depicts the effect of $\omega^2$ on the normalized frame error rate (FER) of 16-state diagonally weighted space-time trellis code (DW-STTC) and the corresponding modified diagonally weighted space-time trellis code (MDW-STTC) for some values of Pc, wherein Pc denotes the probability that the feedback bit is correct.

In poor feedback channel, it is argued that an ω<1 should be chosen to achieve robustness. FIG. 2 shows the effect of $\omega^2$ on the FER of 16-state DW-STTC and the corresponding MDW-STTC for some values of Pc. Here, Pc denotes the probability that the feedback bit is correct. The FER is normalized such that the value corresponding to unweighted STTC is equal to one. In all simulation, a frame consists of 130 transmission.

If $\omega^2$ is appropriately chosen, 16-state MDW-STTC outperforms 16-state DW-STTC over a wide range of feedback channel condition. Although not presented, similar results are obtained for 4, 8, and 32-state MDW-STTC.

FIG. 2 shows that the optimum value of $\omega^2$ of DW-STTC is not one in the even perfect feedback channel, which is caused by the differences of $\gamma_1$ and $\gamma_2$ of some pairwise error events. Through the construction of MDW-STTC, the last statement of criterion 1 reduces the difference of $\bar{\gamma}_1$ and $\bar{\gamma}_2$. Thus $\omega^2=1$ minimizes the FER of MDW-STTC in the feedback channel with high reliability. In the case of 4-state STTC, since $r^2$ of the original STTC is considerably adjusted, $\omega^2=1$ minimizes the FER of DW-STTC in the feedback channel with high reliability and 4-state MDW-STTC has a performance improvement in comparison with 4-state DW-STTC. Such results are illustrated in FIG. 3.

Figure 3:
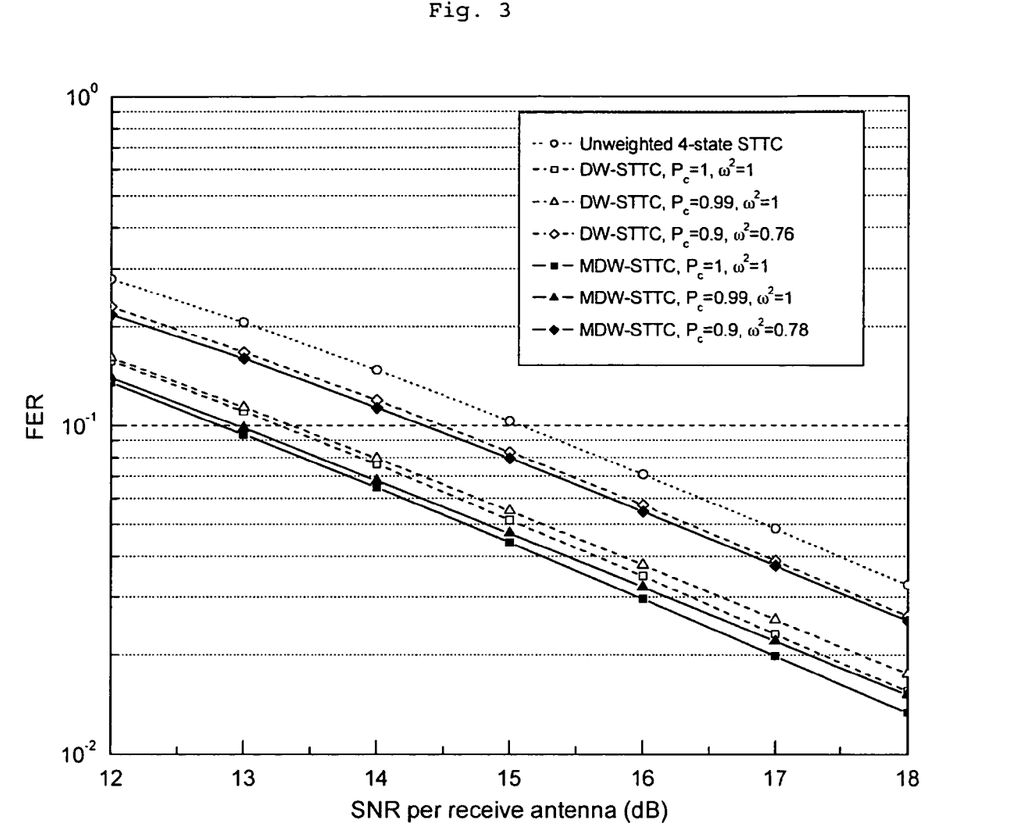
FIG. 3 depicts the effect of $\omega^2$ on the FER of 4-state DW-STTC and the corresponding MDW-STTC for some values of Pc.

FIG. 3 shows the FER performance of 4-state MDW-STTC, in comparison with 4-state DW-STTC for some values of Pc. For each value of Pc, $\omega^2$ minimizing FER is found through computer simulation, which is used for simulation of FIG. 3. As shown, MDW-STTC and DW-STTC has much better performance than unweighted STTC in perfect feedback channel.

Figure 4:
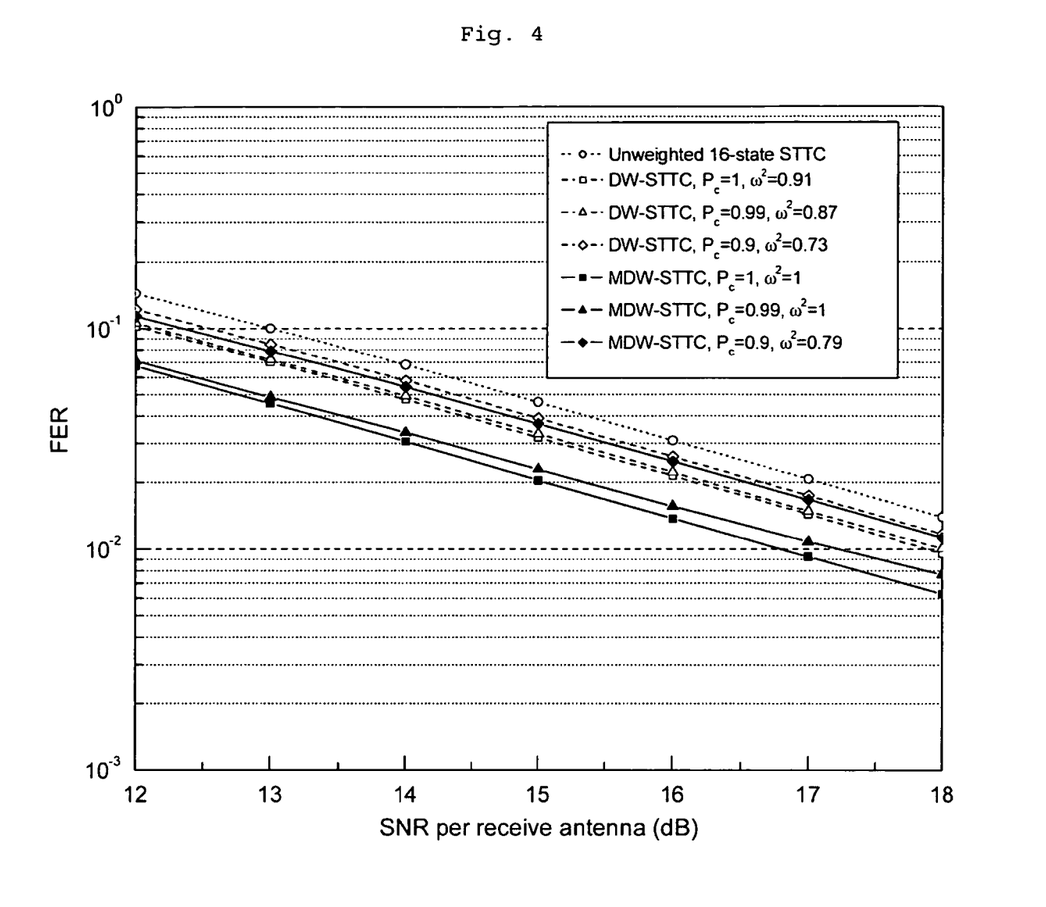
FIG. 4 depicts the effect of $\omega^2$ on the FER of 16-state DW-STTC and the corresponding MDW-STTC for some values of Pc.

FIG. 4 shows the FER performance of 16-state MDW-STTC, in comparison with 16-state DW-STTC for some values of Pc. For each value of Pc, $\omega^2$ minimizing FER is found through computer simulation, which is used for simulation of FIG. 4. As shown, MDW-STTC has much better performance than DW-STTC and unweighted STCC and gains are 1 dB and 2 dB respectively in perfect feedback channel.

Because MDW-STTC is designed in perfect feedback channel, the performance of MDW-STTC is severely degraded in poor feedback channel although MDW-STTC has better performance than unweighted STTC and DW-STTC. Thus, a high reliability of feedback is required to achieve the sufficient performance improvement.

In this embodiment, the diagonally weighted STTC with two transmit antennas using one-bit feedback is considered. From the conditional PEP for DW-STTC in perfect feedback channel, the heuristic design criteria is derived for constructing STTC and weighting matrix. By using the proposed design criterion, a simple modification of STTC is provided to improve the performance of DW-STTC. Simulation results show that the modified STTC achieves better performance than the conventional STTC over the wide range of feedback channel conditions.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for encoding message with space-time trellis code (STTC) and transmitting the encoded message in a communication system employing at least two transmit antennas and at least one receive antenna, comprising steps of:

generating a codeword X by encoding a message using STTC; and multiplying the codeword X by a weighting matrix W, and then transmitting it through the transmit antenna, wherein, the signal received at the receive antenna is given in equation 3:

$$Y=\sqrt{E_s}HWX+N \qquad \text{[Equation 3]}$$

wherein,

X is a 2×1 matrix of a codeword,

W is a 2×2 weighting matrix,

H is an m×2 matrix of channel coefficients,

N is an m×1 matrix of additive noise,

Es is energy per symbol, and

Y is an m×1 matrix of received signals at the receive antenna;

wherein, the weighting matrix W is chosen as $W_1$ or $W_2$ depending on the feedback channel information from the receive antenna to the transmit antenna as given in equation 5:

$$W_1 = \begin{bmatrix} \omega & 0 \\ 0 & \sqrt{1-\omega^2} \end{bmatrix}, \text{ if } |h_1|^2 > |h_2|^2 \qquad \text{[Equation 5]}$$

-continued $$W_2 = \begin{bmatrix} \sqrt{1-\omega^2} & 0 \\ 0 & \omega \end{bmatrix}, \text{otherwise}$$

wherein,
$\omega$ is a positive real number such that $0.5 \leq \omega^2 \leq 1$, and
$h_i$ denotes the i-th column of H;
wherein, conditional pairwise error probability (PEP) for the channel coefficient H is given in equation 6:

$$p(X \to X'|H) \leq \exp(-\rho tr(HW_k A_{X,X'} W_k^\dagger H^\dagger)) \quad \text{[Equation 6]}$$

wherein,
$\rho = E_s/4N_0$,
where $N_0$ is noise power spectrum density,
$A_{X,X'}$ is defined as $(X-X')(X-X')^\dagger$, wherein $\dagger$ denotes the complex conjugate transpose,
k is 1 for $|h_1|^2 > |h_2|^2$, and 2 for $|h_1|^2 < |h_2|^2$,
since $A_{X,X'}$ is Hermitian, there is a unitary matrix U such that $A_{X,X'} = U\Lambda U^\dagger$ and there is a real diagonal matrix $\Lambda = \text{diag}(\lambda_1, \lambda_2)$, and
the unitary matrix $U = \text{unit}(r, \theta_1, \theta_2, \theta_3)$ is given as following equation 7:

$$U = \begin{bmatrix} re^{j\theta_1} & \sqrt{1-r^2}\,e^{j\theta_2} \\ \sqrt{1-r^2}\,e^{j\theta_3} & re^{j(\theta_2-\theta_1+\theta_3+\pi)} \end{bmatrix} \quad \text{[Equation 7]}$$

wherein,
r is a real number such that $0 \leq r \leq 1$, and
$-\pi \leq \theta_1, \theta_2, \theta_3 \leq \pi$; and
wherein, from the following equation 8 regarding conditional PEP for $\{|h_{j,max}|, |h_{j,min}|\}$,
r value is chosen such that $|r^2 - 0.5|$ is minimized, and
$\omega = 1$ is chosen so that the absolute value of $\xi$ is minimized:

$$p(X \to X' | \{|h_{j,max}|, |h_{j,min}|\}) = \quad \text{[Equation 8]}$$

$$\frac{1}{2} \prod_{j=1}^{m} I_0(\rho \xi |h_{j,max}||h_{j,min}|) \times (\exp(-\rho(w^2\gamma_1 \sum_{j=1}^{m} |h_{j,max}|^2 +$$

$$(1-\omega^2)\gamma_2 \sum_{j=1}^{m} |h_{j,min}|^2)) + (\exp(-$$

$$\rho(w^2 \gamma_2 \sum_{j=1}^{m} |h_{j,max}|^2 + (1-\omega^2)\gamma_1 \sum_{j=1}^{m} |h_{j,min}|^2)))$$

wherein,
$\gamma_1 = \lambda_1 r^2 + \lambda_2(1-r^2)$,
$\gamma_2 = \lambda_1(1-r)^2 + \lambda_2 r^2$,
$\xi = 2(\lambda_1 - \lambda_2)\omega r\sqrt{1-\omega^2}\sqrt{1-r^2}$, and $I_0(x)$ is zero-order modified Bessel function of the first kind.

2. A method for encoding message with STTC and transmitting the encoded message in a communication system employing at least two transmit antennas and at least one receive antenna, comprising steps of:
generating a codeword X by a encoding message using STTC;
generating a modified code $\bar{X}$ by multiplying the codeword X by unitary matrix V;
multiplying the modified codeword $\bar{X}$ by weighting matrix W, and then transmitting it through the transmit antenna,
wherein, the signal received at the receive antenna is given as following equation 3a:

$$Y = \sqrt{E_s} HW\bar{X} + N \quad \text{[Equation 3a]}$$

wherein,
$\bar{X}$ is a 2×1 matrix of a codeword,
W is a 2×2 weighting matrix,
H is a m×2 matrix of channel coefficients,
N is a m×1 matrix of additive noise,
Es is energy per symbol, and
Y is a m×1 matrix of received signals at the receive antenna;
wherein, the weighting matrix W is chosen as $W_1$ or $W_2$ depending on the feedback channel information from the receive antenna to the transmit antenna as given following equation 5:

$$W_1 = \begin{bmatrix} \omega & 0 \\ 0 & \sqrt{1-\omega^2} \end{bmatrix}, \text{if } |h_1|^2 > |h_2|^2 \quad \text{[Equation 5]}$$

$$W_2 = \begin{bmatrix} \sqrt{1-\omega^2} & 0 \\ 0 & \omega \end{bmatrix}, \text{otherwise}$$

wherein,
$\omega$ is a positive real number such that $0.5 \leq \omega^2 \leq 1$, and
$h_i$ denotes the i-th column of H;
wherein, conditional PEP for the channel coefficient H is given as following equation 6:

$$p(X \to \bar{X}'|H) \leq \exp(-\rho tr(HW_k A_{\bar{X},\bar{X}'} W_k^\dagger H^\dagger)) \quad \text{[Equation 6]}$$

wherein
$\rho = E_s/4N_0$,
where $N_0$ is noise power spectrum density,
$A_{\bar{X},\bar{X}'}$ is defined as $(\bar{X}-\bar{X}')(\bar{X}-\bar{X}')^\dagger$,
k is 1 for $|h_1|^2 > |h_2|^2$, and 2 for $|h_1|^2 < |h_2|^2$,
Since $A_{\bar{X},\bar{X}'}$ is Hermitian, there is a unitary matrix $\bar{U}$ such that $A_{\bar{X},\bar{X}'} = \bar{U}\Lambda \bar{U}^\dagger$, and there is a real diagonal matrix $\Lambda = \text{diag}(\lambda_1, \lambda_2)$, and
the unitary matrix $\bar{U} = \text{unit}(\bar{r}, \bar{\theta}_1, \bar{\theta}_2, \bar{\theta}_3)$ has a relation of $\bar{U} = VU$ to U of equation 7 and V of equation 7a:

$$U = \begin{bmatrix} re^{j\theta_1} & \sqrt{1-r^2}\,e^{j\theta_2} \\ \sqrt{1-r^2}\,e^{j\theta_3} & re^{j(\theta_2-\theta_1+\theta_3+\pi)} \end{bmatrix} \quad \text{[Equation 7]}$$

$$V = \begin{bmatrix} \hat{r}e^{j\hat{\theta}_1} & \sqrt{1-\hat{r}^2}\,e^{j\hat{\theta}_2} \\ \sqrt{1-\hat{r}^2}\,e^{j\hat{\theta}_3} & \hat{r}e^{j(\hat{\theta}_2-\hat{\theta}_1+\hat{\theta}_3+\pi)} \end{bmatrix} \quad \text{[Equation 7a]}$$

wherein,
r is a real number such that $0 \leq r \leq 1$,
$-\pi \leq \theta_1, \theta_2, \theta_3 \leq \pi$, and
from the relation $\bar{U} = VU$, equation 10 is derived:

$$\bar{r}^2 = r^2 \hat{r}^2 + (1-r^2)(1-\hat{r}^2) + \quad \text{[Equation 10]}$$

-continued
$$2r\hat{r}\sqrt{1-r^2}\sqrt{1-\hat{r}^2}\cos(\theta_1-\theta_3+\hat{\theta}_1-\hat{\theta}_2);$$

wherein, the conditional PEP for $\{|h_{j,max}|, |h_{j,min}|\}$ is given as equation 11, and frame error rate (FER) is given as equation 14:

$$p(\overline{X} \to \overline{X}' | |h_{1,max}|, |h_{1,min}|) \leq \tfrac{1}{2} \cdot (\exp(-\rho \overline{\gamma}_1 |h_{1,max}|^2) + \exp(-\rho \overline{\gamma}_2 |h_{1,max}|^2)) \quad \text{[Equation 11]}$$

$$P_f(e) \leq \sum_{\overline{X} \in \overline{C}} \sum_{\overline{X}' \in \overline{C}, \overline{X} \neq \overline{X}'} (\overline{\gamma}_1^{-2}(\overline{X}, \overline{X}') + \overline{\gamma}_2^{-2}(\overline{X}, \overline{X}'))\rho^{-2} \quad \text{[Equation 14]}$$

wherein, $$\overline{\gamma}_1 = \lambda_1 \overline{r}^2 + \lambda_2(1-\overline{r}^2), \text{ and}$$

$$\overline{\gamma}_2 = \lambda_1(1-\overline{r}^2) + \lambda_2 \overline{r}^2.$$

3. The method according to claim 2, wherein the unitary matrix V is selected as a value which minimizes a union bound of the equation 14.

4. The method according to claim 3, wherein the step of selecting the unitary matrix V comprises steps of:
generating pairwise error event with a predetermined number of minimum determinant;
truncating the union bound using the pairwise error event generated in the above step; and
selecting the unitary matrix V that minimizes the truncated union bound.

\* \* \* \* \*